(12) United States Patent
Kottapalli et al.

(10) Patent No.: US 11,630,719 B1
(45) Date of Patent: Apr. 18, 2023

(54) SYSTEM AND METHOD FOR POTENTIAL SYSTEM IMPAIRMENT DETECTION

(71) Applicant: Dell Products L.P., Round Rock, TX (US)

(72) Inventors: Siva Rama Krishna Kottapalli, North Chelmsford, MA (US); Karthik Hubli, Shrewsbury, MA (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/590,467

(22) Filed: Feb. 1, 2022

(51) Int. Cl.
*G06F 11/07* (2006.01)

(52) U.S. Cl.
CPC ........ *G06F 11/079* (2013.01); *G06F 11/0751* (2013.01); *G06F 11/0793* (2013.01)

(58) Field of Classification Search
CPC . G06F 11/079; G06F 11/0751; G06F 11/0793
See application file for complete search history.

(56) References Cited

U.S. PATENT DOCUMENTS

| | | | |
|---|---|---|---|
| 11,106,563 B2* | 8/2021 | Ajiro | G06F 11/07 |
| 11,216,502 B2* | 1/2022 | Levy | G06F 18/232 |
| 11,461,163 B1* | 10/2022 | Aggarwal | G06F 11/0793 |

\* cited by examiner

*Primary Examiner* — Nadeem Iqbal
(74) *Attorney, Agent, or Firm* — Womble Bond Dickinson (US) LLP (57) ABSTRACT

Methods and systems for managing deployments are disclosed. A deployment may include one or more devices. The devices may include hardware and/or software components. The operation of the deployment may depend on the operation of these devices and components. For example, improper operation of any of these devices and/or components may impair (e.g., reduce performance, reduce functionality, etc.) the operation of the deployment. To manage the operation of the deployment, the system may include a deployment manager. The deployment manager may obtain logs for components of the deployment reflecting the historical operation of these components and use the logs to predict the future operation of the deployment. If it is determined that a deployment is likely to become impaired in the future, then the deployment manager may take proactive action to reduce the likelihood of the deployment entering the impairment state.

20 Claims, 8 Drawing Sheets

SYSTEM AND METHOD FOR POTENTIAL SYSTEM IMPAIRMENT DETECTION

FIELD

Embodiments disclosed herein relate generally to operation management. More particularly, embodiments disclosed herein relate to systems and methods to proactively manage the operation of systems.

BACKGROUND

Computing devices may provide computer implemented services. The computer implemented services may be used by users of the computing devices and/or devices operably connected to the computing devices. The computer implemented services may be performed with hardware components such as processors, memory modules, storage devices, and communication devices. The operation of these components may impact the performance of the computer implemented services.

BRIEF DESCRIPTION OF THE DRAWINGS

Embodiments disclosed herein are illustrated by way of example and not limitation in the figures of the accompanying drawings in which like references indicate similar elements.

DETAILED DESCRIPTION

Various embodiments will be described with reference to details discussed below, and the saaccompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment. The appearances of the phrases "in one embodiment" and "an embodiment" in various places in the specification do not necessarily all refer to the same embodiment.

In general, embodiments disclosed herein relate to methods and systems for managing deployments. A deployment may include one or more devices. The devices may include hardware and/or software components. The operation of the deployment may depend on the operation of these devices and components. For example, improper operation of any of these devices and/or components may impair (e.g., reduce performance, reduce functionality, etc.) the operation of the deployment.

To manage the operation of the deployment, the system may include a deployment manager. The deployment manager may obtain logs for components of the deployment reflecting the historical operation of these components and use the logs to predict the future operation of the deployment. For example, the logs may be used to determine whether a deployment will become impaired in the future. If it is determined that a deployment is likely to become impaired in the future, then the deployment manager may take proactive action to reduce the likelihood of the deployment entering the impairment state.

To provide accurate inferences regarding the future operation of the deployment, the logs may be processed prior to being used for inference generation. For example, logs may not be natively designed for automated interpretation. The preprocessing of the logs may place the processed logs in a state where they may be efficiently used in automated processing for inference determination.

Thus, embodiments disclosed herein may provide an improved computing device that is better able to use a range of data sources for prediction generation, including some data sources that are not intended for automated processing. By doing so, the quantity of data usable for interference generation may be enhanced thereby providing for inferences of potentially higher accuracy.

Further, by utilizing preprocessing, the quantity of data necessary for accurate inference may be reduced. For example, large quantities of data included in logs may not be helpful in generating inferences. Rather, the pattern of messages may be more predictive of the future operating state of a deployment, but the logs may not specify a type of each message such that common messages can be easily identified. Embodiment disclosed herein may provide for a method of identifying common messages that are not self-identified as being common. The method may utilize a set of automatically generated templates (which may be updated over time) usable to identify common messages. In this manner, as the components of a deployment and/or contents of messages from the components change over time, a deployment manager in accordance with an embodiment may be able to automatically identify common messages and use the common messages to drive downstream inference generation and deployment management processes.

In an embodiment, a computer-implemented method for managing operation of a deployment by proactively identifying when the deployment is likely to enter an impairment state is disclosed. The method may include obtaining logs for the deployment, the logs reflecting activity of the deployment that may be relevant to the impairment state; obtaining, using the logs and one or more templates, processed logs comprising processed messages, the processed messages being based on messages of the logs and modified to indicate that at least two of the messages of the logs having different content should be treated as being a same message; and performing an action set based on the processed logs to reduce a likelihood of the deployment entering the impairment state.

The templates may specify a set of rules for processing the messages of the logs, the set of rules identifying portion of the messages that are to be treated as a same message based on a portion of the content of each respective message of the portion of the messages.

The portion of the content of each respective message may include repetitive content and excludes variable content of each respective message of the portion of the messages.

Obtaining the processed logs may include obtaining a set of training logs; replacing variable content of the training logs with one or more type identifiers to obtain first updated logs; and replacing non-alphanumeric characters of the first updated logs with one or more place holders to obtain second updated logs.

Obtaining the processed logs may also include grouping messages of the second updated logs into groups based on lengths of each respective message of the second updated logs, the groupings defined by white space in the messages of the second updated logs to obtain groupings of the messages of the second updated logs; for each of the groupings: dividing the messages in each respective grouping into sub-groupings based on a first and a last token of the respective message in each respective grouping.

Obtaining the processed logs may further include: for each of the sub-groupings: dividing the messages in the respective sub-groupings into clusters based on a quantification of a level of similarity between the messages in the respective sub-groupings; and obtaining a cardinality of a number of messages in each respective cluster of the clusters.

Obtaining the processed logs may also include for each respective cluster having a cardinality that falls below a threshold: combing the respective cluster with another cluster of the clusters to obtain a combined cluster having a cardinality that falls above the threshold, the another cluster being selected based on the quantification of the level of similarity.

Obtaining the processed logs may include generating the templates based on the clusters, the templates may include a cardinality of rules corresponding to a cardinality of the clusters.

Obtaining the processed logs may also include: for each respective cluster of the clusters, mitigating differences between messages of the respective cluster to obtain difference mitigated clusters of messages.

The action set may include applying an inference model to the processed logs to identify a remediation action; and performing the remediation action on the deployment, the remediation action comprising at least one action of a group of actions consisting of: modifying a setting of a component of the deployment; disabling operation of the component of the deployment; modifying a workload performed by the deployment to avoid use of the component to perform the workload; and updating an application hosted by the deployment.

A non-transitory media may include instructions that when executed by a processor cause the computer-implemented method to be performed.

A data processing system may include the non-transitory media and a processor, and may perform the computer-implemented method when the computer instructions are executed by the process.

Figure 1:
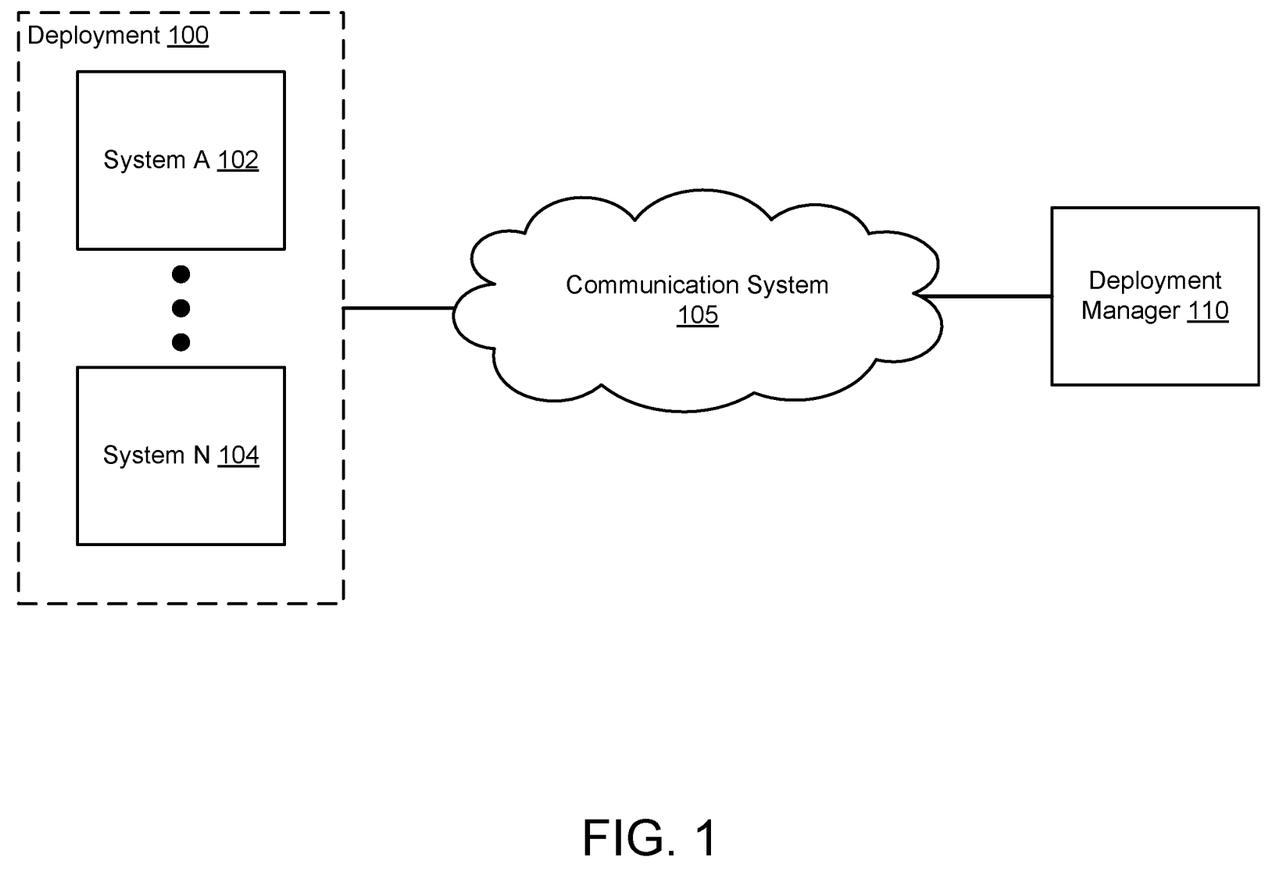
FIG. 1 shows a block diagram illustrating a system in accordance with an embodiment.

Turning to FIG. 1, a block diagram illustrating a system in accordance with an embodiment is shown. The system shown in FIG. 1 may provide computer implemented services. The system may include deployment 100. Deployment 100 may include any number of computing devices that provide the computer implemented services. For example, deployment 100 may include one or more system 102, 104 that may independently and/or cooperatively provide the computer implemented services.

For example, all, or a portion, of systems 102-104 of deployment 100 may provide computer implemented services to users and/or other computing devices operably connected to deployment 100. The computer implemented services may include any type and quantity of services including, for example, database services, instant messaging services, video conferencing services, etc. Different systems may provide similar and/or different computer implemented services.

In an embodiment, deployment 100 provides data management services to other entities (e.g., client not shown in FIG. 1). Data management services may include storing of data (e.g., from clients) and providing copies of stored data (e.g., to clients).

To provide the computer implemented services, deployment 100 may host applications that provide these (and/or other) computer implemented services. The applications may be hosted by one or more of systems 102, 104 of deployment 100.

Any of systems 102-104, and components thereof, as well as hosted entities (e.g., applications that provide computer implemented services, other applications that manage the operation of deployment 100, etc.) may be subject to undesired operation. For example, due to various operating conditions, flaws in design, and/or for other reasons, any of these hardware and/or software components may operate in a manner that diverges from nominal (e.g., desired) operation. Further, over time, the hardware components and/or software components of deployment 100 may be changed, modified, etc. that may result in changes to its operation (e.g., which may not be desired)

When operating, any of these components may generate one or more logs. A log may be a data structure that includes operational information regarding deployment 100 such as, for example, descriptions of conditions encountered by a component, a time when the condition was encountered, an identifier associated with a condition and/or generator of the log, an indication of a relative level of importance or severity of the encountered conditions, and/or other types of information. While the logs may include information regarding the current operation of deployment 100, the logs may not be easily interpretable. For example, the logs may include large amounts of information which may change even when a same issue or condition is being reported by the log repeatedly.

In general, embodiments disclosed herein may provide systems, devices, and methods for proactively managing deployments to reduce the likelihood of the deployments operating in an undesired manager. A system in accordance with an embodiment may include deployment manager 110. Deployment manager 110 may generate predictions of future operating behavior of deployment 100 (and/or components thereof) and use the predictions to reduce the likelihood of deployment 100 operating in an undesired manner in the future.

To provide its functionality, deployment manager 110 may (i) collect logs for the hardware and/or software components of deployment 100, (ii) process the collected logs to place them in a format conducive to interference generation (or other types of subsequent processing), (iii) use the processed logs to decide how to manage a deployment, and/or (iv) perform one or more actions (e.g., an "action set") to reduce the likelihood of deployment 100 operating in an undesirable manner in the future based on the decided course for management of the deployment. By doing so, a system in accordance with embodiments disclosed herein may provide deployments having, for example, (i) improved uptime, (ii) improved user experiences by avoiding phantom slowdowns and/or pauses (e.g., due to undesired operating behavior), and/or (iii) improve computing resource availability for desired computer implemented services by reducing computing resource expenditures for management and/ or remedial action.

Figure 3A:
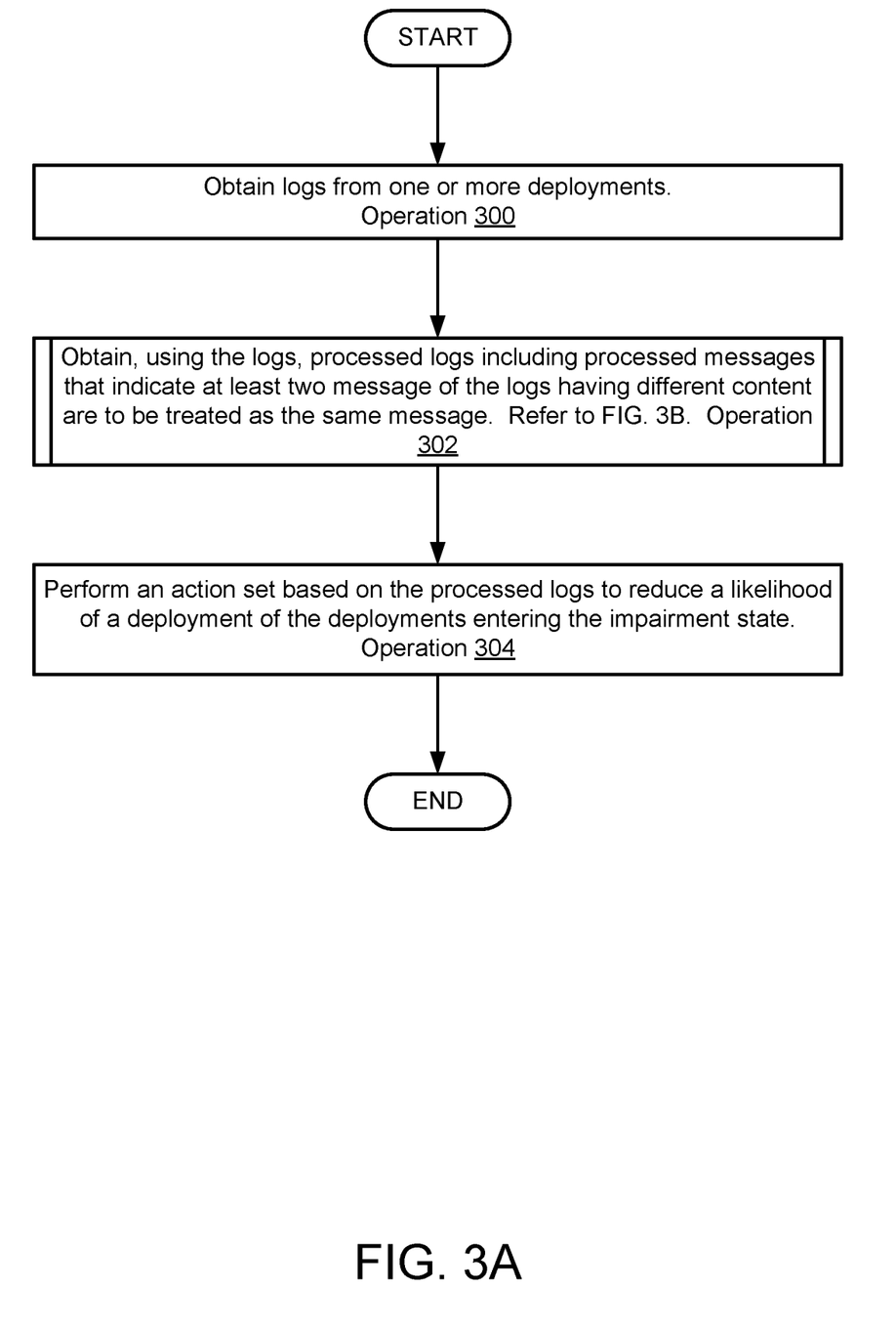
FIG. 3A shows a flow diagram illustrating a method of reducing the likelihood of a deployment entering an impairment state in accordance with an embodiment.
Figure 3B:
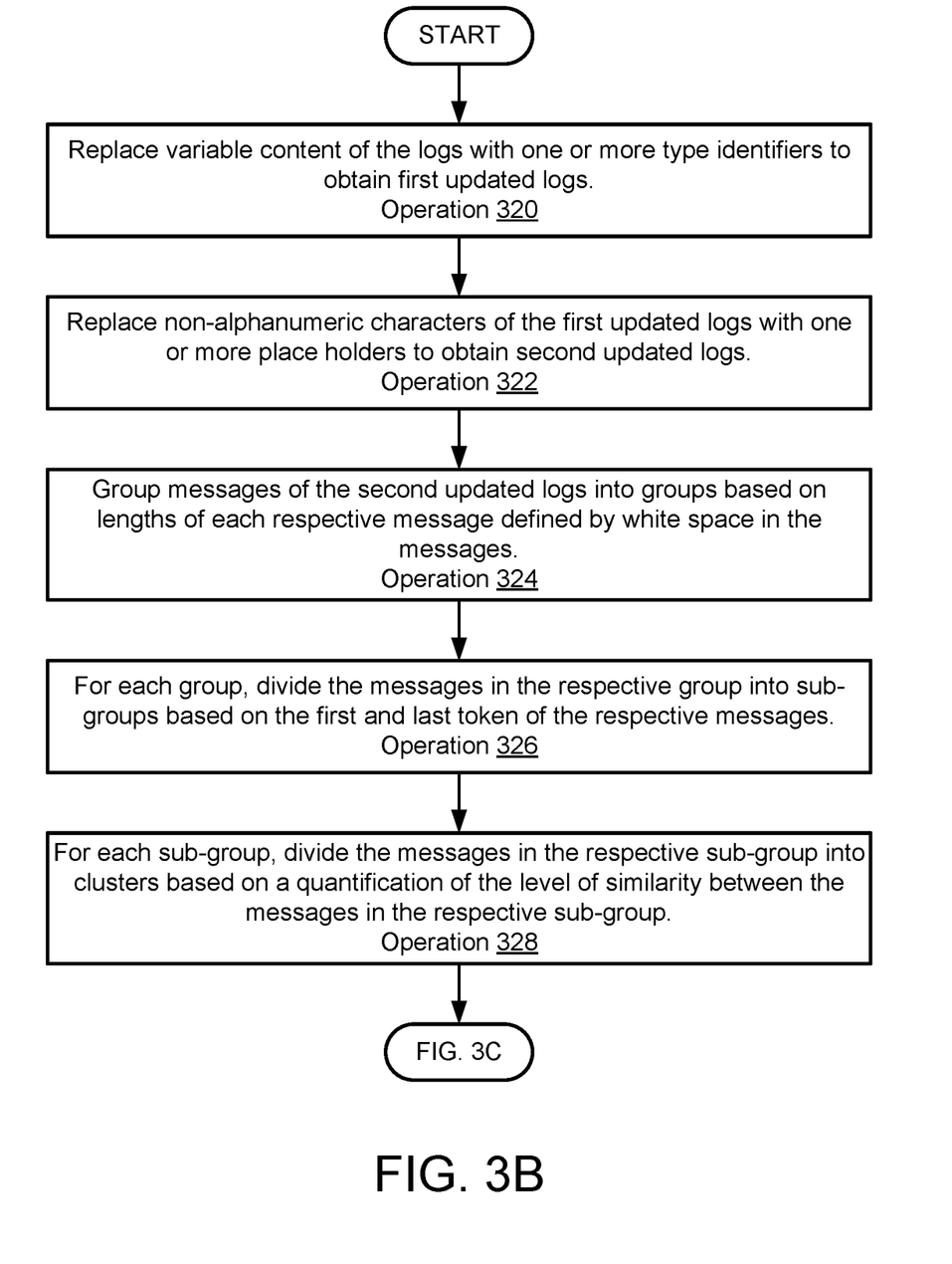
FIG. 3B shows a first flow diagram illustrating a method of obtaining processed logs in accordance with an embodiment.
Figure 3C:
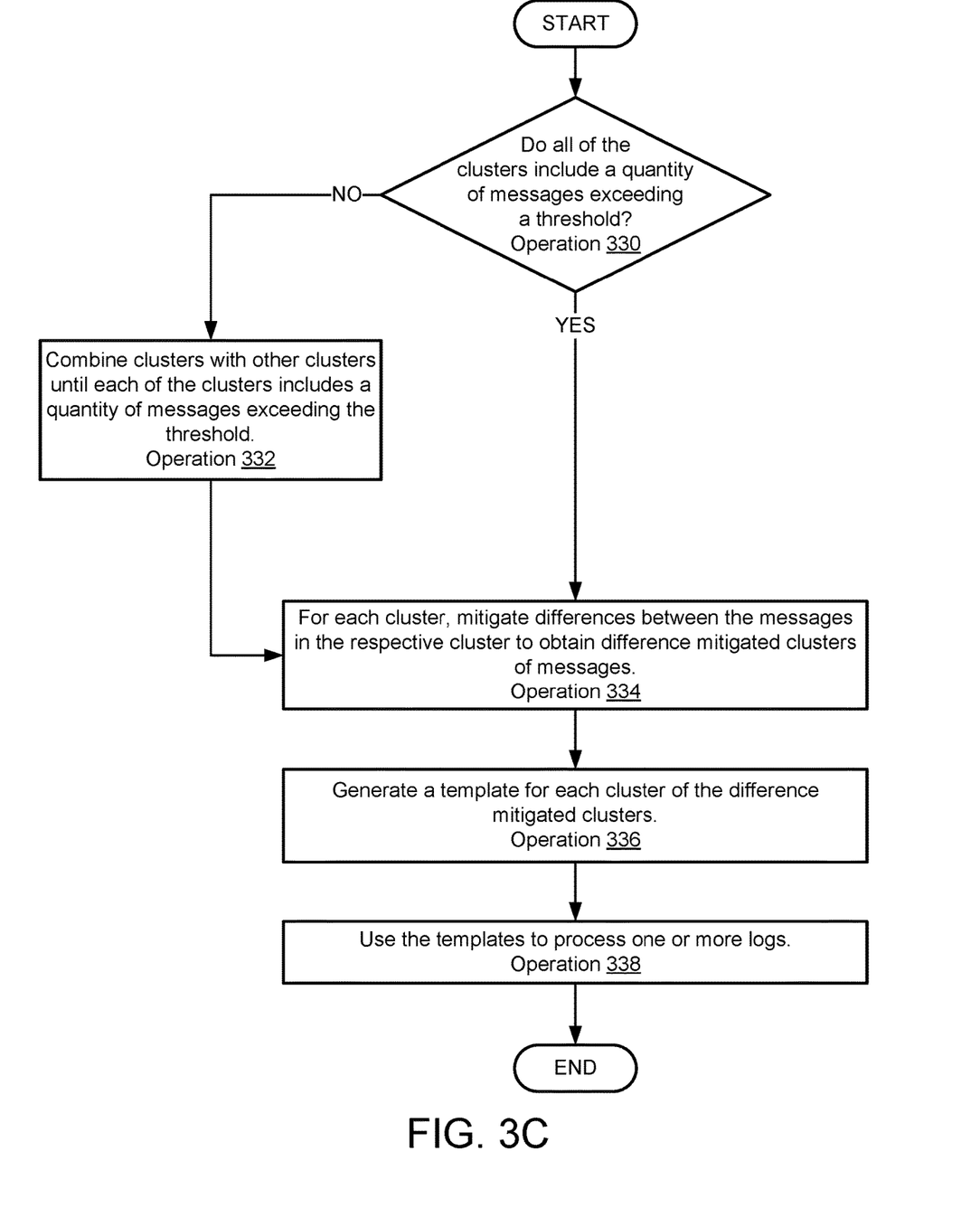
FIG. 3C shows a second flow diagram illustrating the method of obtaining processed logs in accordance with an embodiment.
Figure 4:
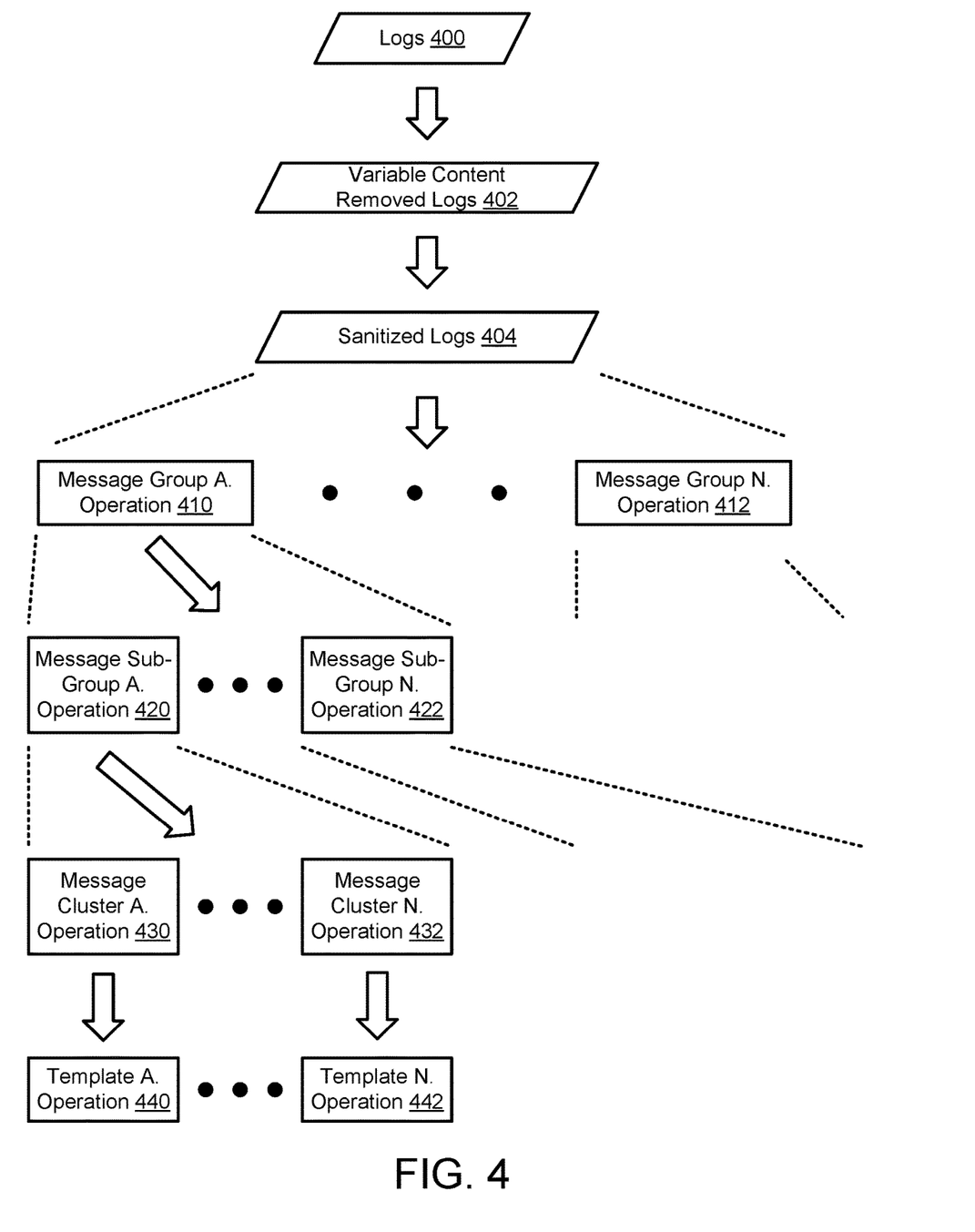
FIG. 4 shows a block diagram illustrating log processing in accordance with an embodiment.

When providing its functionality, deployment manager may perform all, or a portion, of the methods, operations, and/or actions shown in FIGS. 3A-4.

Deployment 100, systems 102-104, and/or deployment manager 110 may be implemented using a computing device such as a host or server, a personal computer (e.g., desktops, laptops, and tablets), a "thin" client, a personal digital assistant (PDA), a Web enabled appliance, or a mobile phone (e.g., Smartphone), an embedded system, local controllers, and/or any other type of data processing device or system. For additional details regarding computing devices, refer to FIG. 5.

Any of the components illustrated in FIG. 1 may be operably connected to each other (and/or components not illustrated) with communication system 105. In an embodiment, communication system 105 includes one or more networks that facilitate communication between any number of components. The networks may include wired networks and/or wireless networks (e.g., and/or the Internet). The networks may operate in accordance with any number and types of communication protocols (e.g., such as the interne protocol).

While illustrated in FIG. 1 as included a limited number of specific components, a system in accordance with an embodiment may include fewer, additional, and/or different components than those illustrated therein.

Figure 2A:
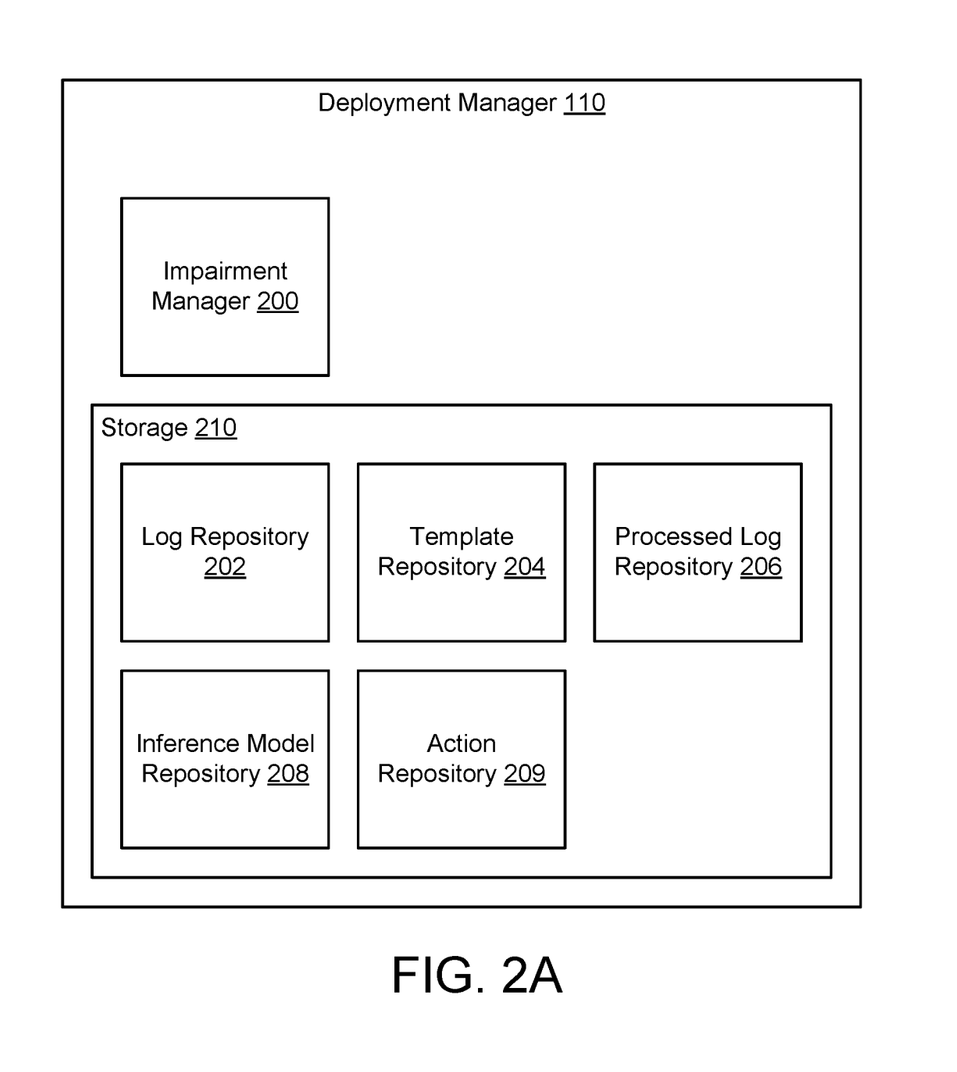
FIG. 2A shows a block diagram illustrating a deployment manager in accordance with an embodiment.

Turning to FIG. 2A, a diagram of deployment manager 110 in accordance with an embodiment is shown. Deployment manager 110 may provide deployment management services. The deployment management services may provide for proactive identification and/or remediation of undesired operation of a deployment that may occur in the future. To provide its functionality, deployment manager 110 may include impairment manager 200 and storage 210. Each of these components is discussed below.

Impairment manager 200 may (e.g., to provide all, or a portion, of the deployment management services): (i) obtain logs from various deployments and store them in log repository 202, (ii) process some logs (e.g., live logs for which future operating conditions are to be predicted) of log repository 202 using templates in template repository 204 to obtained processed logs, (iii) store the processed logs in processed log repository 206, (iv) generate one or more future operating condition predictions using the processed logs of processed log repository 206 as input to one or more inference models stored in inference model repository 208, and/or (v) when a prediction indicates an undesired operation of a deployment in the future, perform an action set to reduce the likelihood of the deployment entering the undesired operation state.

In an embodiment, logs of log repository 202 include any number and quantity of messages. A message may be data structure generated by a deployment that includes information regarding its operation. A message may be generated, generally, in a format that is readable by a person such that an administrator may be able to interpret and use the messages to diagnose operation of the deployment. However, a message may be challenging for use with inference models or other predictive entities. For example, the message may be formed as a string of text without metadata to directly indicate which portions of the string correspond to different types of information. Further, the messages may not correspond to a globally defined standard. Consequently, messages from different components may include different information content, may be based on different formats, and/or may present more challenges for computer automated interpretation and use. Additionally, because the components of a deployment may change over time (and/or the components a deployment may change the manner in which they generate messages), use of fixed rules for general interpretation of message of logs may not be feasible.

In an embodiment, log repository 202 includes logs used to obtain templates (e.g., training data used to obtain templates) and other logs (e.g., live logs) for which inferences may be made and used to manage a deployment. The logs used to obtain templates may correspond to historic data while the live logs may correspond to active deployments that are being managed. For additional details regarding logs and log repository 202, refer to FIGS. 2B and 2C.

In an embodiment, template repository 204 includes information usable to place logs into a form (e.g., processed logs) usable by inference models of inference model repository 208. For example, template repository 204 may include rules, pattern matching processes, and/or other information usable to convert logs of log repository 202 into processed logs. Processing the logs may include, for example, making commonalities between messages (e.g., that may otherwise be obscured) explicit in the processed logs. Consequently, when an inference model processes a processed log, it may treat multiple messages in processed log repository 206 as being a same type of message whereas in contrast the inference model may treat the multiple messages in log repository 202 as not being a same type of message (e.g., as being dissimilar).

For example, a message may include large amounts of identification information such as when the message was generated, when the message was appended to a log, a time stamp associated with when an event occurred, etc. This type of information may change between messages even when the messages are reporting a same condition or occurrence of an event. Consequently, this type of information may make using logs (e.g., directly) for generating inferences challenging (e.g., because it may not be correlated strongly with outcome whereas a type of the message may be correlated strongly with outcomes). In contrast, the processed logs of processed log repository 206 may not suffer from the challenge. Accordingly, the inference models of inference model repository 208 may generally make accurate predictions when using processed logs as a basis for the inferences.

In an embodiment, processed log repository 206 includes any number of processed logs. The processed logs may include any number of messages that have been processed to explicitly specify a type of the message. For example, template repository 204 may specify rules (e.g., for pattern identification) that allow a same type of message in a log to be identified. The messages of processed logs may indicate this message to message similarity. Thus, the inferences models of inference model repository 208 may utilize the indicated message to message similarities to make inferences. In contrast, the messages of logs of logs repository 202 may not explicitly include such information thereby causing inferences generated based on such logs to be of lower accuracy.

In an embodiment, inference model repository 208 include any number and type of inference model. An inference model may take, as input, any number of processed messages and generate, as output, predictions of the future operation of one or more deployments. In an embodiment, the inference models are implemented using machine learning models (or other predictive algorithms). The machine learning models may be trained using historic data (e.g., past relationships between processed log entries and subsequently occurring operating conditions) to generate desired inferences (e.g., future operating conditions). The future operating conditions may be keyed to various actions included in action repository 209.

In an embodiment, action repository 209 includes any number and types of actions to be performed in response to the likely occurrence of a future operating condition of a deployment. The actions may be keyed (e.g., may be associated with operating conditions or other types of inferences) to inferences generated by inference models of inference model repository 208. The actions may be specified by, for example, an administrator, through a computer implemented learning process, or via other methods.

When providing its functionality, impairment manager 200 may perform all, or a portion, of the operations of methods and/or actions discussed with respect to FIGS. 3A-4.

In an embodiment, impairment manager 200 is implemented using a hardware device including circuitry. The hardware device may be, for example, a digital signal processor, a field programmable gate array, or an application specific integrated circuit. The circuitry may be adapted to cause the hardware device to perform the functionality of impairment manager 200. Impairment manager 200 may be implemented using other types of hardware devices without departing from embodiments disclosed herein.

In one embodiment, impairment manager 200 is implemented using a processor adapted to execute computing code stored on a persistent storage that when executed by the processor performs the functionality of impairment manager 200 discussed throughout this application. The processor may be a hardware processor including circuitry such as, for example, a central processing unit or a microcontroller. The processor may be other types of hardware devices for processing digital information without departing from embodiments disclosed herein.

When providing its functionality, impairment manager 200 may store data and use data stored in storage 210.

In an embodiment, storage 210 is implemented using physical devices that provide data storage services (e.g., storing data and providing copies of previously stored data). The devices that provide data storage services may include hardware devices and/or logical devices. For example, storage 210 may include any quantity and/or combination of memory devices (i.e., volatile storage), long term storage devices (i.e., persistent storage), other types of hardware devices that may provide short term and/or long term data storage services, and/or logical storage devices (e.g., virtual persistent storage/virtual volatile storage).

For example, storage 210 may include a memory device (e.g., a dual in line memory device) in which data is stored and from which copies of previously stored data are provided. In another example, storage 210 may include a persistent storage device (e.g., a solid-state disk drive) in which data is stored and from which copies of previously stored data is provided. In a still further example, storage 210 may include (i) a memory device (e.g., a dual in line memory device) in which data is stored and from which copies of previously stored data are provided and (ii) a persistent storage device that stores a copy of the data stored in the memory device (e.g., to provide a copy of the data in the event that power loss or other issues with the memory device that may impact its ability to maintain the copy of the data cause the memory device to lose the data).

Storage 210 may also be implemented using logical storage. A logical storage (e.g., virtual disk) may be implemented using one or more physical storage devices whose storage resources (all, or a portion) are allocated for use using a software layer. Thus, a logical storage may include both physical storage devices and an entity executing on a processor or other hardware device that allocates the storage resources of the physical storage devices.

While illustrated in FIG. 2A as including a limited number of specific components, a deployment manager in accordance with an embodiment may include fewer, additional, and/or different components than shown in FIG. 2A.

Figure 2B:
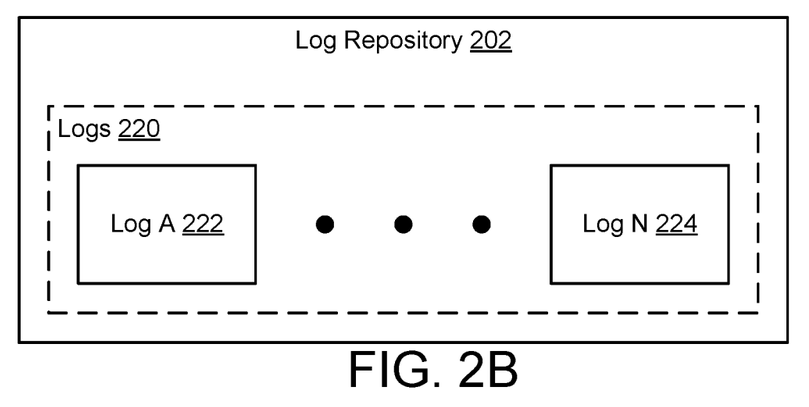
FIG. 2B shows a block diagram illustrating a log repository in accordance with an embodiment.
Figure 2C:
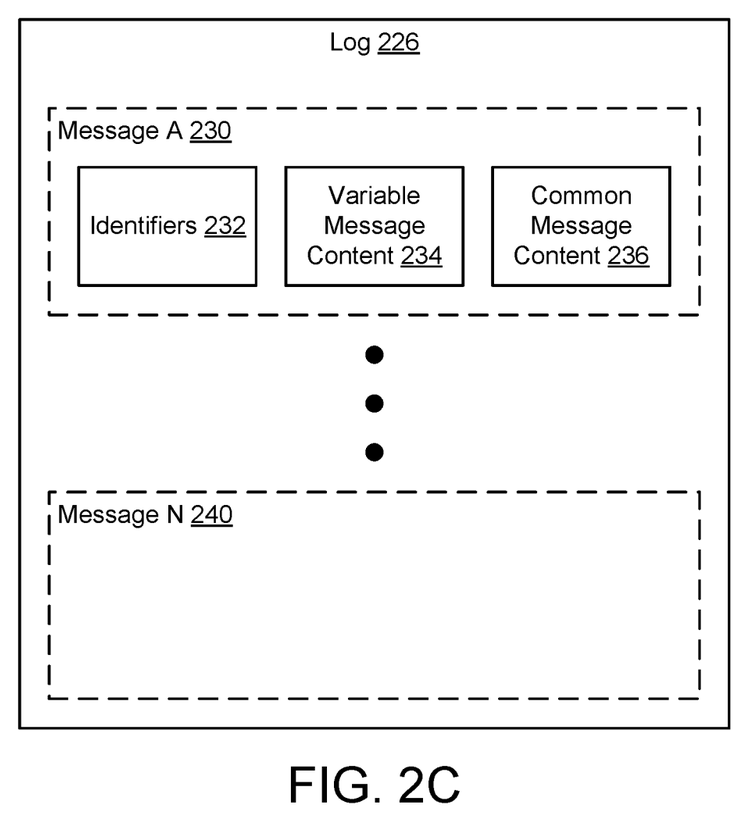
FIG. 2C shows a block diagram illustrating a log in accordance with an embodiment.

Turning to FIGS. 2B-2C, these figures may illustrate data structures usable by components of the system of FIG. 1. Any of these data structures may be implemented using, for example, lists, tables, databases, linked lists, and/or other type of data structures. Any of the data structures may be shared, spanned across multiple devices, and may be maintained and used by any number of entities. Additionally, while illustrated as including a limited amount of specific data, any of these data structures may include additional, less, and/or different data without departing from embodiments disclosed herein.

Turning to FIG. 2B, a diagram of log repository 202 in accordance with an embodiment is shown. Log repository 202 may include any number of logs 220 from any number of deployments. Some of logs 220 may correspond to previous periods of time and may be used to obtain templates, to train inference models, and for other purposes.

Other logs of logs 220 may correspond to a current period of time and may be used to generate future operating predictions for a deployment. For example, the other logs of logs 220 may be used as input to inference models which generate the future operating predictions.

Over time, the number and quantity of logs 220 in log repository 202 may change. For example, as some of the logs (e.g., 222) may be removed while other logs (e.g., 224) may be added. Consequently, the contents of log repository 202 may be updated over time to reflect more recent activity of one or more deployments.

Turning to FIG. 2C, a diagram of log 226 in accordance with an embodiment is shown. Any of logs 220 may be similar to log 226. Log 226 may be for a component of a deployment.

Log 226 may include any number of messages 230, 240. A message may correspond to an event, condition, or other occurrence that the component encountered and intends to report. Each message 230, 240 may include one or more identifiers 232, variable message contents 234, and common message contents 236.

Identifiers 232 may include one or more identifiers that (i) identify the message (e.g., 230), (ii) identify a period or point of time associated with the message (e.g., a time stamp corresponding to when generation of the message was triggered, completed, initiated, etc.). For example, an identifier of a message may be implemented with a unique identifier (e.g., that distinguishes the entry from other entries) and one or more non-unique identifiers to provide other information.

Variable message content 234 may include unstructured data (e.g., a string of text) that includes any type and content of information that is not common between messages of a similar type. For example, variable message content 234 may include information unrelated to the cause of the message thereby rendering it to be less useful for prediction purposes.

In contrast, common message content 236 may include unstructured data (e.g., a string of text) that includes any type and content of information that is common between messages of a similar type. For example, common message content 236 may include information related to the cause of the message thereby rendering it to be useful for prediction purposes. Additionally, by being similar in each message, it may be useful for pattern recognition purposes. As will be discussed in greater detail below, embodiments disclosed herein may provide for the generation of templates usable to classify messages into different types based on common message contents 236 included in messages.

While illustrated in FIG. 2C as including only one variable and one common message contents, a message in accordance with embodiment disclosed herein may include any number of such message contents arranged in any order with respect to one another.

In an embodiment, messages 230, 240 include spacing or another common quantity between different portions of a message. Messages 230, 240 may include other defined structures without departing from embodiments disclosed herein. However, messages 230, 240 may not include metadata explicitly defining all of the portions of their respective structures. Thus, it may be computationally expensive to utilize natural language processing or other methods of extracting information from other otherwise interpreting messages 230, 240.

While various data structures have been illustrated and described in FIGS. 2A-2C with specific structures, any of the data structures may be implemented with different structures (e.g., lists, tables, linked lists, databases, etc.), stored in different locations, and/or spanned across any number of devices without departing from embodiments disclosed herein.

As discussed above, the components of FIG. 1 may perform various methods to increase the likelihood of a deployment being able to provide computer implemented services by proactively addressing potential impairments. FIGS. 3A-4C illustrate methods that may be performed by the components of FIG. 1. In the diagrams discussed below and shown in FIGS. 3A-3C, any of the operations may be repeated, performed in different orders, and/or performed in parallel with or in a partially overlapping in time manner with other operations.

Turning to FIG. 3A, a flow diagram illustrating a method of reducing a likelihood of a deployment entering an impairment state in accordance with an embodiment is shown.

At operation 300, logs one or more deployments are obtained. The logs may include any quantity and type of log. In an embodiment, a portion of the logs are historical logs that relate to past logs and operation of deployment. In an embodiment, another portion of the logs are live logs that are being actively managed. The live logs may be related to current and/or past operation of a deployment.

In an embodiment, the logs are obtained from the deployments. For example, requests (e.g., using a message passed to the deployments) for the logs may be sent to the deployments and the deployments may provide (e.g., via one or more messages) the logs in response to the requests. Such messages and/or data may be passed via a communication system operably connecting the deployment manager and the deployments.

In an embodiment, the logs are provided by the deployments. For example, the deployments may implement a publish subscribe system and the deployment manager may be subscribed to the logs generated by the deployments.

In an embodiment, the logs are obtained from an aggregation service or other type of third party services. The aggregation service may aggregate and provide logs to requesting entities (e.g., to facilitate large scale log distribution while limiting the workload placed on the deployments for such distribution).

At operation 302, processed logs are obtained using the logs. The processed logs may include processed messages that indicate at least two messages of the logs having different content are to be treated as the same message.

In an embodiment, the logs are processed using templates. The templates may specify patterns in the logs that indicate a type of each message. Thus, when a message of a log is received, it may be typed using the templates.

In an embodiment, the processed logs include less information than the logs. For example, patterns corresponding to types in the messages of the logs may be replaced with type identifiers or other data structures. Likewise, variable message contents may be removed to further simplify the processed logs such that inference models may generate higher accuracy predictions using the processed logs (in contrast to the logs which may include such a large amount of information that is not predictive or correlated with a future operating state of the deployment that an inference model may not be sensitive enough to make accurate predictions using the logs).

In an embodiment, the logs are processed via the method illustrated in FIGS. 3B and 3C.

At operation 304, an action set is performed based on the processed logs to reduce a likelihood of a deployment of the deployments entering an impairment state.

In an embodiment, the action set is identified using an inference model. The inference model may take the processed logs as input and output a prediction. The prediction may be used to identify one or more actions (e.g., which may be keyed to the prediction and may be stored in an action repository). The one or more actions may be used as the action set.

The actions of the action set may include, for example, (i) notifying an administrator, (ii) modifying operation of a component of a deployment, (ii) suspending operation of a component of a deployment, (iii) migrating or otherwise modifying a workload to not rely on a component for performance of the workload, (iv) restarting the deployment (and/or a portion of the components thereof, or reinitializing them), (v) updating an application hosted by the deployment, and/or (vi) performing other actions to reduce the likelihood of the deployment entering the impairment state.

The method may end following operation 304.

Turing to FIGS. 3B and 3C, a flow diagram illustrating a method of obtaining processed logs in accordance with an embodiment is shown. FIG. 3C may be a continuation of the method illustrated in FIG. 3B.

At operation 320, variable content of the logs (e.g., historic logs used for template generation and/or inference model training) is replaced with one or more type identifier to obtain first updated logs. For example, various identifiers, time stamps, and other easily identifiable portions of the messages of the logs may be replaced with a message.

For example, consider a scenario where a log message recites "Tue Feb 9 3:28:29 2021 ESRV_VE.pl:17185 Base url for ACTION_TRANSFERFILE is: esrs/v1/devices/unity/APM0000000/mft/APM0000000_20210209_032823_cloudOpMgmt_alerts_v1.tar." which may indicate that on Feb. 9, 2021 at 3:28 PM a message was received that indicates that a particular location (e.g., esrs/v1/devices . . . ) is used for the action TRANSFERFILE. In this case, all of the numerical portions of the message and other portions that are expected to move (e.g., variable content) may be replaced with an identifier such as * resulting in the partially processed message of "* * * * * * Base url for * is: *"".

At operation 322, non-alphanumeric characters of the first updated logs are replaced with one or more place holders to obtain second updated logs. For example, characters such as "@", "&", etc. may be replaced with a placeholder that allows all such characters (e.g., a character class" to be easily identified in the processed messages without needing to perform comparisons, pattern matching, etc..

At operation 324, the message of the second updated logs are grouped into groups based on lengths of each respective message defined by white space in the messages. For example, the partially-processed messages of the second updated logs may be interrogated to identify a quantity of remaining alpha numeric terms included in each message, and messages which similar number of terms may be placed into corresponding groups.

For example, continuing with the previous example "* * * * * * Base url for * is: *", this message may be interrogated and broken down into the following tokens: "*", "*", "*", "*", "*", "*", "Base url for", "*", "is", and "*". Consequently, this example message may have a length of 10. Accordingly, it may be placed in a group where all of the messages in the group have 10 tokens.

At operation 326, for each group, the messages in the respective group are divided into sub-groups based on the first and last token of the respective messages. For example, continuing with the previous example "* * * * * * Base url for * is: *", this message may be grouped with other messages that also have a first token of "*" and a last token of "*".

In another example, if a first partially processed message is "* * * * * * Request *" and a second partially processed message is "* * * * * * Call *", both messages may be grouped together because both include a same number of tokens and both start and stop with the same tokens even though some tokens in the middle differ between these tokenization of the messages.

At operation 328, for each sub-group, the messages in the respective sub-group are divided into clusters based on a quantification of the level of similarity between the messages in the respective subgroup. The quantification may be the Levenshtein distance metric which may specify a numerical value quantification for the similarity of two strings (e.g., in this case two messages). Messages having low Levenshtein distance metrics (which indicate similarity of content) may be grouped into corresponding clusters.

For example, consider a scenario where there are four messages M1-M4 having Levenshtein distance metrics of M1-M2: 0.5, M2-M3: 3.0, M3-M4: 0.5, and M4-M1: 4. In this scenario messages M1 would be grouped with message M2 and message M3 would be grouped with message M4 due to the high degree of similarly between these messages.

At this point, any number of clusters of partially-processed messages may be formed, with each cluster including any number of messages.

Turning to FIG. 3C, at operation 330, it is determined whether all of the clusters include a quantity of messages that exceeds a threshold. The threshold may specify a minimum quantity of messages that are to be included in each cluster. The minimum may be set, for example, based on a level of availability of computing resources usable to dedicate to generating inferences. For example, lower thresholds may result in a high degree of diversity of log data thereby requiring more processing and more log data to be used to generate accurate inferences using inference models.

In an embodiment, the threshold is obtained through domain specific knowledge and/or trial and error. For example, multiple thresholds may be utilized and the performance of each threshold with respect to limiting the computational load for processing message of logs (and/or other goals) may be evaluated to identify the threshold (e.g., one of the multiple thresholds that are evaluated). In this manner, the threshold value may be customized to meet demands of different domains (e.g., different deployments that may generate logs with difference characteristics) and/or adapt to changes in the logs produced by deployments over time (e.g., as the operation of the deployments changes over time through, for example, component of a deployment updating, components of a deployment being replaced, etc.).

If it is determined that all of the clusters include a quantity of messages exceeding the threshold, then the method may proceed to operation 334. Otherwise the method may proceed to operation 332.

At operation 332, some of the clusters are combined with other clusters until each of the clusters includes a quantity of messages exceeding the threshold. The clusters combined with other clusters may include those clusters lacking the quantity of messages to exceed the threshold, and other clusters which Levenshtein distance metrics indicate are similar and have sufficient quantity of messages such that the combined cluster includes a quantity of messages that exceeds the threshold. In other words, at operations 330 and 332, groups of clusters that include messages that are the most likely to be of a same type may be combined until the resulting clusters all have a minimum quantity of messages exceeding the threshold.

In an embodiment, clusters are merged with the cluster having a closest Levenshtein distance. When a merge is performed, a ratio of the number of messages in the child cluster to the number of messages in the parent cluster may be determined. If the ratio is less than a pre-defined value for the ratio, then the parent cluster may be selected for additional merging until a resulting parent cluster is formed that has a number of messages exceeding the threshold number of messages for each cluster. Like the threshold, the value for the ratio may be identified through a process of trial and error, performance ranking of the tried values for the ratio, and/or through domain specific knowledge.

At operation 334, for each cluster, differences between the messages in the respective clusters are mitigated to obtain difference mitigated clusters of entries. For example, the messages in each cluster may be compared to identify different tokens in each message, and the different tokens in each message may be replaced with a placeholder such as a character like "*" or another character.

At operation 336, a template for each cluster of the difference mitigated clusters is generated. The template may allow for messages of a similar type corresponding to each respective cluster to be efficiently identified in the future. Likewise, the template may allow for all messages of the same type to be appropriately processed by downstream entities, such as inference models. For example, the messages, when identified as being of a type, may be marked or otherwise modified or managed to indicate that it is of a particular type thereby allowing downstream entities to be afforded with enhanced data regarding the contents of the messages and the messages themselves. Consequently, downstream users of the processed message may be better able to make accurate inferences.

In the event that any duplicate templates are generated, only a single template may be retained. For example, the template repository may be updated to only include a single copy of the resulting template thereby further reducing the complexity of processing messages.

At operation 338, the templates are used to process logs. The processed logs may be live logs for which inferences are to be generated. In contrast, the logs used in operations 300-336 may be historic logs through which templates may be obtained (or may also be used as live logs, or a combination thereof).

Processing the logs may result in the generation of processed logs, which may be consumed by downstream entities such as inference models.

The method may end following operation 338.

Using the methods illustrated in FIGS. 3A-3C, a system may proactively remediate potential impairments of deployments in a computationally efficient manner. As noted above, because logs are not intrinsically consumable for computer implemented system for lack of metadata, embodiments disclosed herein may provide an improved computing system that is able to consume and utilize a broader array of information. The disclosed method includes an ordered set of operation of processing logs that facilitates use of processed logs in computer implemented processes. Accordingly, embodiments disclosed herein may improve the operation of a computing device by providing it with new processing capabilities, namely, consumption of information in a format that is not natively interpretable by a computing device.

As part of this process, a specific number of operations are performed on messages of logs to obtain processed logs. Turning to FIG. 4, a block diagram of processing of logs 400 in accordance with an embodiment is shown. In this figure, dashed lines are used to indicate relationships between various groupings and clusters. Additionally, some elements are omitted for brevity. For example, there may be any number of message sub-groups corresponding to message group N 412 but are not shown merely for brevity.

To process logs 400, the logs are initially subjected to variable message content removal to remove variable content such as, timestamps, identifiers of the logs, processing identifiers, severity identifiers, and other easily identifiable but variable information is removed. The resulting variable content removed logs 402 may include any number of partially processed messages.

Variable content removed logs 402 may then be subjected to sanitization processing by removing non-alphanumeric characters resulting in the generation of sanitized logs 404.

After sanitized logs 404 are obtained, the length of each message may be calculated. The length may be the number of tokens in each message. The tokens may be delineated from one another in each message by white space. Thus, the message "hello world" may include two tokens while the message "hello happy day" may include three tokens.

The length of each message may be used to group the messages into various message groups 410, 412. Each message group may correspond to a different message length. Each group may include any number of tokens.

The messages of each message group may then be subject to sub-group processing by dividing them into sub-groups. The division may be based on the first and last character in each message. In an embodiment, the division is based on the first and last token in each message. Messages having the same first and last token may be grouped in a same sub-group resulting in any number of message sub-groups 420, 422 for each message group being obtained. Each message sub-group may include any number of messages.

The messages of each sub-group may then be subjected to cluster processing by dividing them into clusters. The division may be based on a similarly of the messages to one another, as discussed above. Messages of a sub-group that are similar to one another may be added to a same cluster while messages that are different from one another may be added to different clusters. Any number of message clusters 430, 432 may be obtained by the cluster processing.

If any of the clusters include too few messages, then the clusters may be combined with clusters that include similar clusters until the combined clusters have a number of messages exceeding a threshold. Similarly, differences between messages in each of the clusters may be mitigated.

At this stage, the messages in each cluster are ready for downstream use by inference models and/or other entities because they have been enhanced by being grouped in a cluster which adds additional information, namely, that all of the messages in a cluster are to be treated as a similar type. To facilitate rapid future message typing, templates 440, 442 corresponding to each message cluster (e.g., 430, 432) are obtained. These templates 440, 442 may include rules and/or other information usable to efficiently type messages (e.g., identify its type by, for example, performing pattern matching).

Thus, as seen in FIG. 4, by performing the aforementioned processing once, templates may be generated that may allow for rapid and computationally efficient method of identifying a type of each message of subsequently encountered logs.

Figure 5:
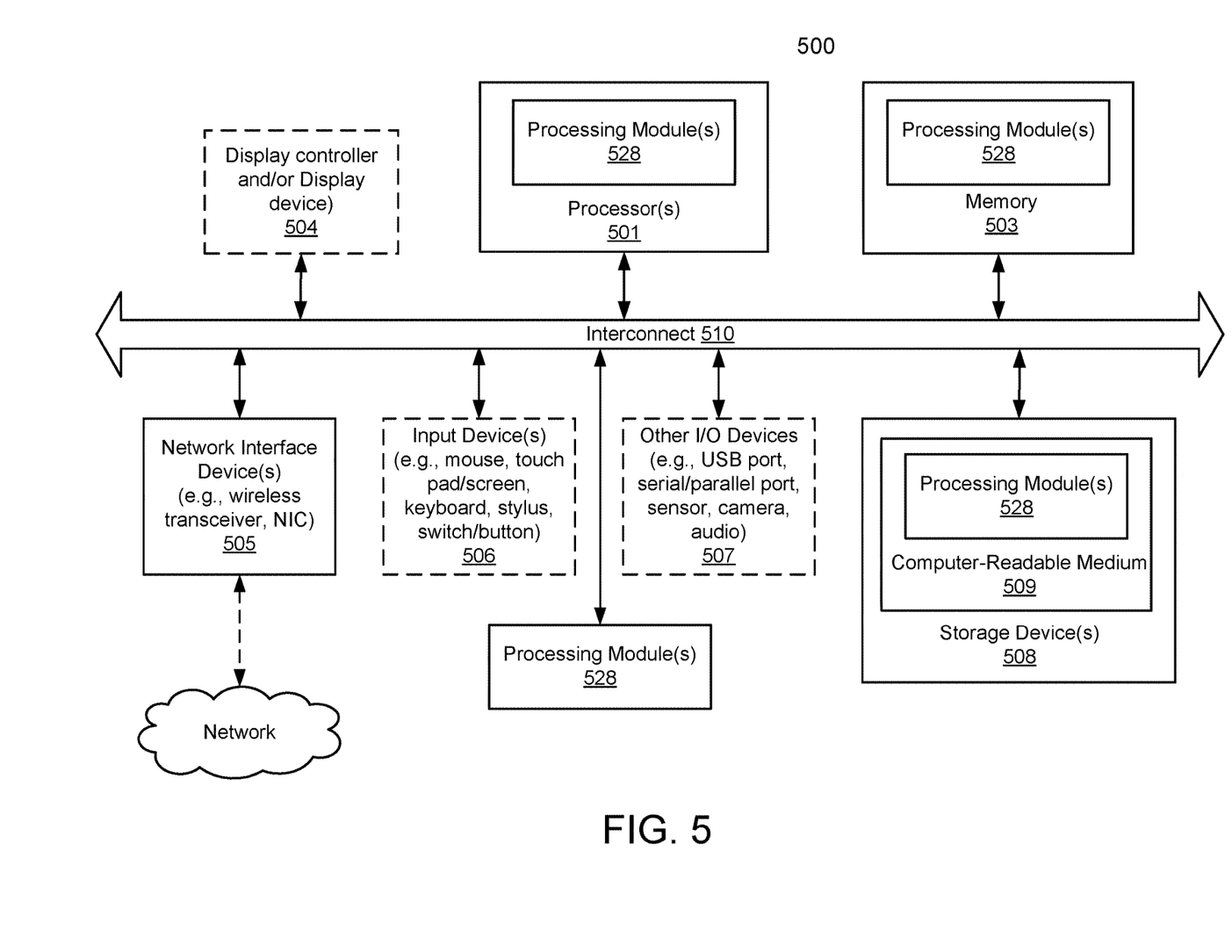
FIG. 5 shows a block diagram illustrating a data processing system in accordance with an embodiment.

Any of the components illustrated in FIGS. 1-4 may be implemented with one or more computing devices. Turning to FIG. 5, a block diagram illustrating an example of a data processing system (e.g., a computing device) in accordance with an embodiment is shown. For example, system 500 may represent any of data processing systems described above performing any of the processes or methods described above. System 500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 500 is intended to show a high level view of many components of the computer system. However, it is to be understood that additional components may be present in certain implementations and furthermore, different arrangement of the components shown may occur in other implementations. System 500 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 500 includes processor 501, memory 503, and devices 505-508 via a bus or an interconnect 510. Processor 501 may represent a single processor or multiple processors with a single processor core or multiple processor cores included therein. Processor 501 may represent one or more general-purpose processors such as a microprocessor, a central processing unit (CPU), or the like. More particularly, processor 501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 501 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 501, which may be a low power multi-core processor socket such as an ultra-low voltage processor, may act as a main processing unit and central hub for communication with the various components of the system. Such processor can be implemented as a system on chip (SoC). Processor 501 is configured to execute instructions for performing the operations discussed herein. System 500 may further include a graphics interface that communicates with optional graphics subsystem 504, which may include a display controller, a graphics processor, and/or a display device.

Processor 501 may communicate with memory 503, which in one embodiment can be implemented via multiple memory devices to provide for a given amount of system memory. Memory 503 may include one or more volatile storage (or memory) devices such as random access memory (RAM), dynamic RAM (DRAM), synchronous DRAM (SDRAM), static RAM (SRAM), or other types of storage devices. Memory 503 may store information including sequences of instructions that are executed by processor 501, or any other device. For example, executable code and/or data of a variety of operating systems, device drivers, firmware (e.g., input output basic system or BIOS), and/or applications can be loaded in memory 503 and executed by processor 501. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 500 may further include IO devices such as devices (e.g., 505, 506, 507, 508) including network interface device(s) 505, optional input device(s) 506, and other optional IO device(s) 507. Network interface device(s) 505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 506 may include a mouse, a touch pad, a touch sensitive screen (which may be integrated with a display device of optional graphics subsystem 504), a pointer device such as a stylus, and/or a keyboard (e.g., physical keyboard or a virtual keyboard displayed as part of a touch sensitive screen). For example, input device(s) 506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 507 may include an audio device. An audio device may include a speaker and/or a microphone to facilitate voice-enabled functions, such as voice recognition, voice replication, digital recording, and/or telephony functions. Other IO devices 507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 510 via a sensor hub (not shown), while other devices such as a keyboard or thermal sensor may be controlled by an embedded controller (not shown), dependent upon the specific configuration or design of system 500.

To provide for persistent storage of information such as data, applications, one or more operating systems and so forth, a mass storage (not shown) may also couple to processor 501. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 501, e.g., via a serial peripheral interface (SPI). This flash device may provide for non-volatile storage of system software, including a basic input/output software (BIOS) as well as other firmware of the system.

Storage device 508 may include computer-readable storage medium 509 (also known as a machine-readable storage medium or a computer-readable medium) on which is stored one or more sets of instructions or software (e.g., processing module, unit, and/or processing module/unit/logic 528) embodying any one or more of the methodologies or functions described herein. Processing module/unit/logic 528 may represent any of the components described above. Processing module/unit/logic 528 may also reside, completely or at least partially, within memory 503 and/or within processor 501 during execution thereof by system 500, memory 503 and processor 501 also constituting machine-accessible storage media. Processing module/unit/logic 528 may further be transmitted or received over a network via network interface device(s) 505.

Computer-readable storage medium 509 may also be used to store some software functionalities described above persistently. While computer-readable storage medium 509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of embodiments disclosed herein. The term "computer-readable storage medium" shall accordingly be taken to include, but not be limited to, solid-state memories, and optical and magnetic media, or any other non-transitory machine-readable medium.

Processing module/unit/logic 528, components and other features described herein can be implemented as discrete hardware components or integrated in the functionality of hardware components such as ASICS, FPGAs, DSPs or similar devices. In addition, processing module/unit/logic 528 can be implemented as firmware or functional circuitry within hardware devices. Further, processing module/unit/logic 528 can be implemented in any combination hardware devices and software components.

Note that while system 500 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

What is claimed is:

1. A computer-implemented method for managing operation of a deployment by proactively identifying when the deployment is likely to enter an impairment state, the method comprising:
    obtaining logs for the deployment, wherein the logs comprise messages and reflect activity of the deployment that may be relevant to the impairment state;
    obtaining, using the logs and one or more templates, processed logs comprising processed messages, wherein obtaining the processed messages of the processed logs further comprises:
    determining that at least two messages among the messages of the logs have different content but are directed to reporting a same condition; and
    based on the determining, including an indication in the processed logs that the at least two messages are a same type of message; and
    performing an action set based on the processed logs to reduce a likelihood of the deployment entering the impairment state.

2. The computer-implemented method of claim 1, wherein the templates specify a set of rules for processing the messages of the logs, the set of rules indicating the at least two messages are to be indicated as the same type of message in the processed logs based on comparing a content of each of the at least two messages.

3. The computer-implemented method of claim 2, wherein comparing the content of each of the at least two messages comprises:
    determining, using the set of rules, that a portion of each of the at least two messages includes repetitive content, and wherein the portion of each of the at least two messages that includes the repetitive content does not include variable content included in each of the at least two messages.

4. The computer-implemented method of claim 1, wherein obtaining the processed logs comprises:
    obtaining a set of training logs;
    replacing variable content of the training logs with one or more type identifiers to obtain first updated logs; and replacing non-alphanumeric characters of the first updated logs with one or more place holders to obtain second updated logs.

5. The computer-implemented method of claim 4, wherein obtaining the processed logs further comprises:
grouping messages of the second updated logs into groups based on lengths of each respective message of the second updated logs, the groupings defined by white space in the messages of the second updated logs to obtain groupings of the messages of the second updated logs;
for each of the groupings:
dividing the messages in each respective grouping into sub-groupings based on a first and a last token of the respective message in each respective grouping.

6. The computer-implemented method of claim 5, wherein obtaining the processed logs further comprises:
for each of the sub-groupings:
dividing the messages in the respective sub-groupings into clusters based on a quantification of a level of similarity between the messages in the respective sub-groupings; and
obtaining a cardinality of a number of messages in each respective cluster of the clusters.

7. The computer-implemented method of claim 6, wherein obtaining the processed logs further comprises:
for each respective cluster having a cardinality that falls below a threshold:
combing the respective cluster with another cluster of the clusters to obtain a combined cluster having a cardinality that falls above the threshold, the another cluster being selected based on the quantification of the level of similarity.

8. The computer-implemented method of claim 7, wherein obtaining the processed logs further comprises:
generating the templates based on the clusters,
wherein the templates comprise a cardinality of rules corresponding to a cardinality of the clusters.

9. The computer-implemented method of claim 7, wherein obtaining the processed logs further comprises:
for each respective cluster of the clusters, mitigating differences between messages of the respective cluster to obtain difference mitigated clusters of messages.

10. The computer-implemented method of claim 1, wherein the action set comprises:
applying an inference model to the processed logs to identify a remediation action; and
performing the remediation action on the deployment, the remediation action comprising at least one action of a group of actions consisting of:
modifying a setting of a component of the deployment;
disabling operation of the component of the deployment;
modifying a workload performed by the deployment to avoid use of the component to perform the workload; and
updating an application hosted by the deployment.

11. A non-transitory machine-readable medium having instructions stored therein, which when executed by a processor, cause the processor to perform operations for managing operation of a deployment by proactively identifying when the deployment is likely to enter an impairment state, the operations comprising:
obtaining logs for the deployment, wherein the logs comprise messages and reflect activity of the deployment that may be relevant to the impairment state;
obtaining, using the logs and one or more templates, processed logs comprising processed messages, wherein obtaining the processed messages of the processed logs further comprises:
determining that at least two messages among the messages of the logs have different content but are directed to reporting a same condition; and
based on the determining, including an indication in the processed logs that the at least two messages are a same type of message; and
performing an action set based on the processed logs to reduce a likelihood of the deployment entering the impairment state.

12. The non-transitory machine-readable medium of claim 11, wherein the templates specify a set of rules for processing the messages of the logs, the set of rules indicating that the at least two messages are to be indicated as the same type of message in the processed logs based on comparing a content of each of the at least two messages.

13. The non-transitory machine-readable medium of claim 12, wherein comparing the content of each of the at least two messages comprises:
determining, using the set of rules, that a portion of each of the at least two messages includes repetitive content, and wherein the portion of each of the at least two messages that includes the repetitive content does not include variable content included in each of the at least two messages.

14. The non-transitory machine-readable medium of claim 11, wherein obtaining the processed logs comprises:
obtaining a set of training logs;
replacing variable content of the training logs with one or more type identifiers to obtain first updated logs; and
replacing non-alphanumeric characters of the first updated logs with one or more place holders to obtain second updated logs.

15. The non-transitory machine-readable medium of claim 14, wherein obtaining the processed logs further comprises:
grouping messages of the second updated logs into groups based on lengths of each respective message of the second updated logs, the groupings defined by white space in the messages of the second updated logs to obtain groupings of the messages of the second updated logs;
for each of the groupings:
dividing the messages in each respective grouping into sub-groupings based on a first and a last token of the respective message in each respective grouping.

16. A deployment manager, comprising:
a processor; and
a memory coupled to the processor to store instructions, which when executed by the processor, cause the processor to perform operations for managing operation of a deployment by proactively identifying when the deployment is likely to enter an impairment state, the operations comprising:
obtaining logs for the deployment, wherein the logs comprise messages and reflect activity of the deployment that may be relevant to the impairment state;
obtaining, using the logs and one or more templates, processed logs comprising processed messages, wherein obtaining the processed messages of the processed logs further comprises:
determining that at least two messages among the messages of the logs have different content but are directed to reporting a same condition; and based on the determining, including an indication in the processed logs that the at least two messages are a same type of message; and performing an action set based on the processed logs to reduce a likelihood of the deployment entering the impairment state.

17. The deployment manager of claim 16, wherein the templates specify a set of rules for processing the messages of the logs, the set of rules indicating that the at least two messages are to be indicated as the same type of message in the processed logs based on comparing a content of each of the at least two messages.

18. The deployment manager of claim 17, wherein comparing the content of each of the at least two messages comprises:

determining, using the set of rules, that a portion of each of the at least two messages includes repetitive content, and wherein the portion of each of the at least two messages that includes the repetitive content does not include variable content included in each of the at least two messages.

19. The deployment manager of claim 16, wherein obtaining the processed logs comprises:

obtaining a set of training logs;

replacing variable content of the training logs with one or more type identifiers to obtain first updated logs; and replacing non-alphanumeric characters of the first updated logs with one or more place holders to obtain second updated logs.

20. The deployment manager of claim 19, wherein obtaining the processed logs further comprises:

grouping messages of the second updated logs into groups based on lengths of each respective message of the second updated logs, the groupings defined by white space in the messages of the second updated logs to obtain groupings of the messages of the second updated logs;

for each of the groupings:

dividing the messages in each respective grouping into sub-groupings based on a first and a last token of the respective message in each respective grouping.

* * * * *